United States Patent [19]

Speich

[11] Patent Number: 5,286,056
[45] Date of Patent: Feb. 15, 1994

[54] DEVICE FOR ABSORBING ENERGY TRANSMITTED THROUGH A VEHICLE STEERING COLUMN

[75] Inventor: Gerald A. Speich, Beausale, England

[73] Assignee: The Torrington Company, Torrington, Conn.

[21] Appl. No.: 51,139

[22] Filed: Apr. 22, 1993

[30] Foreign Application Priority Data

Jun. 19, 1992 [GB] United Kingdom ............ 9213078.0

[51] Int. Cl.$^5$ .................................................. B62D 1/19
[52] U.S. Cl. ...................................... 280/777; 74/493; 188/371; 280/775
[58] Field of Search ............... 280/775, 777, 779; 74/493; 188/371

[56] References Cited

U.S. PATENT DOCUMENTS

| 4,014,219 | 3/1977 | Feustel et al. ...................... 74/492 |
| 4,774,851 | 10/1988 | Iwanami et al. ................... 188/371 |
| 4,786,076 | 11/1988 | Wierschem .......................... 280/777 |
| 4,838,576 | 6/1989 | Hamasaki et al. .................. 280/777 |
| 5,052,716 | 10/1991 | Matsumoto ......................... 280/777 |
| 5,131,286 | 7/1992 | Sturges et al. ..................... 188/371 |

FOREIGN PATENT DOCUMENTS

| 2130307 | 2/1972 | Fed. Rep. of Germany . |
| 2821707 | 11/1978 | Fed. Rep. of Germany . |
| 1120799 | 7/1968 | United Kingdom . |
| 1346443 | 6/1971 | United Kingdom . |
| 1396408 | 6/1975 | United Kingdom . |
| 1502647 | 3/1978 | United Kingdom . |
| 2219772A | 12/1989 | United Kingdom . |
| 2244032A | 11/1991 | United Kingdom . |

Primary Examiner—Eric Culbreth
Attorney, Agent, or Firm—Michael H. Minns

[57] ABSTRACT

A device to absorb energy transmitted through a steering column for a vehicle in the event of a vehicle crash and/or driver impact on the steering wheel includes a slotted member in the form of a saddle bracket for connection to a steering column, a second member in the form of a bolt or the like extending through the slot of the first member and a third member in the form of a strap which is arranged to restrict relative movement between the first and second members upon vehicle crash, etc. The strap is stiff but ductile and is wrapped over the bolt so that, if the steering column collapses, the bolt will move in a direction out of the slot of the first member and run into the strap which is then unwrapped, thereby absorbing energy transmitted through the steering column. The strap can also itself be slotted.

9 Claims, 2 Drawing Sheets

DEVICE FOR ABSORBING ENERGY TRANSMITTED THROUGH A VEHICLE STEERING COLUMN

BACKGROUND OF THE INVENTION

This invention relates generally to a mechanism for absorbing energy transmitted through a vehicle steering column in the event of a vehicle crash or driver impact on the steering wheel and more particularly to an energy absorbing mechanism for an adjustable steering column.

A known problem has been one of how to absorb chest impact energies in a vehicle steering column which is rake and reach adjustable. Rake adjustable steering columns differ from tilt adjustable steering columns in that the pivot point is remote from the steering wheel rather than being close to the steering wheel. Designs in existence tend to rely on crushing or extending a convoluted tube, which have the problem of relatively high tool cost and low natural frequency. Low natural frequency of a steering column can be a problem in vehicles having engines which produce low frequencies, such as diesel engines.

The foregoing illustrates limitations known to exist in present mechanisms for absorbing energy transmitted through an adjustable steering column in the event of a vehicle crash. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a mechanism for absorbing energy transmitted through a reach adjustable vehicle steering column in an impact situation, the mechanism comprising: a steering column support member; a slot located in the steering column support member; a bolt arrangement coupling the steering column with the support member while allowing the steering column to extend, the bolt arrangement being located in the slot to allow the bolt arrangement to be adjusted thereby; and energy absorption means for absorbing energy transmitted to the bolt arrangement from the steering column upon impact, the energy absorption means comprising a strap-like member which is wrapped around the bolt arrangement and is plastically deformed in an impact situation, thereby absorbing energy.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
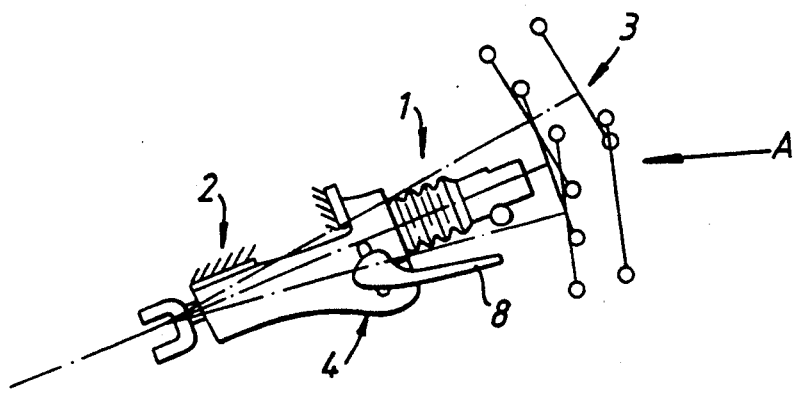
FIG. 1 is a diagrammatic illustration of a reach and rake adjustable steering column.
Figure 2:
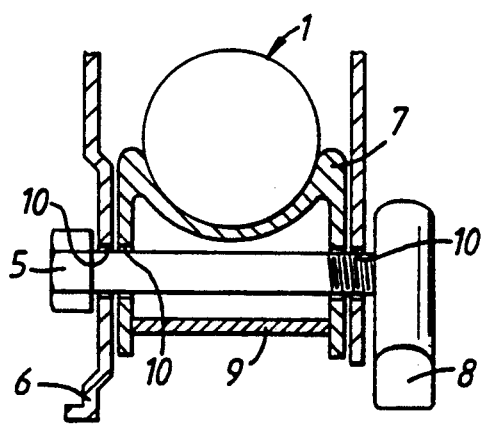
FIG. 2 is a cross-sectional view of the adjustment mechanism of a prior art reach adjustable steering column.
Figure 3:
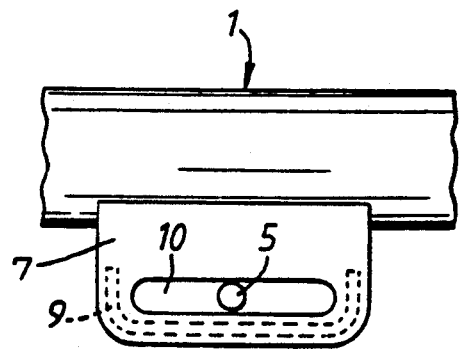
FIG. 3 is a side view of the adjustment mechanism shown in FIG. 2.

FIGS. 1 to 3 schematically illustrate a problem with prior art adjustable reach steering columns. A reach adjustable steering column is one in which the steering wheel and associated steering column can be moved axially closer to and further away from the driver. It will be seen that the problem is caused by the upper part 1 of the steering column having to move up and down and in and out relative to the supporting brackets 2, thereby preventing the use of a fixed energy absorbing portion between them. The lines indicated generally by the reference numeral 3 indicate various steering wheel positions attainable by the adjustable upper steering column, while the arrow A illustrates the direction of driver impact in the event of a vehicle crash.

The steering wheel 3 is held in the desired position by means of a clamping mechanism 4 which typically comprises a bolt 5, a mounting bracket 6 to hold the steering column to the vehicle, a saddle bracket 7 which locates an outer tube of the upper steering column 1 and can be of a wrap around type or simply located underneath, and an operating handle 8 to lock and unlock to prevent the saddle bracket 7 from crushing when clamped. A support bracket 9 is attached or welded to the side portions of the saddle bracket 7. As can be seen in FIG. 3, the bolt 5 is freely located in pairs of slots 10 both in the mounting bracket 6 and the saddle bracket 7.

With this prior construction, if the driver's chest impacts the steering wheel 3, the bolt 5 is caused to bottom out at one end of each slot 10, at which point the convoluted portion of the steering column tube starts to collapse or extend.

According to the present invention, there is provided a device to absorb energy transmitted through an adjustable steering column for a vehicle in the event of a vehicle crash and/or driver impact on the steering wheel, the device including an adjustment mechanism comprising a first slotted member for connection to a steering column for reach adjustment thereof, a second member extending through the slot of said first member, said second member being utilized to clamp the adjusting mechanism, and a third member arranged to restrict relative movement between said first and second members upon vehicle crash and/or driver impact on the steering wheel, thereby to absorb said energy transmitted through the steering column, said third member also serving to support said first member and to limit steering column adjustment.

The invention extends to a vehicle steering column incorporating a device essentially as defined in the preceding paragraph. Preferably, the slot is open-ended so that the second member leaves the slot upon vehicle crash and/or driver impact. Preferably, the second member is a bolt or similar member. Preferably, the third member is in the form of a strap-like member which is wrapped over the second member so that it unwraps and plastically deforms upon vehicle crash and/or driver impact, thereby absorbing energy.

Referring to FIGS. 1 and 4 through 8, it will be seen that the first member comprises the saddle bracket 7 but in this case, the pairs of slots are formed as slots 11, each with an open end 11A.

The second member is the bolt 5 which, when the clamping mechanism 4 is released, is able to run freely in the slot 11 for adjustment of the steering wheel 3 in and out.

Figure 4:
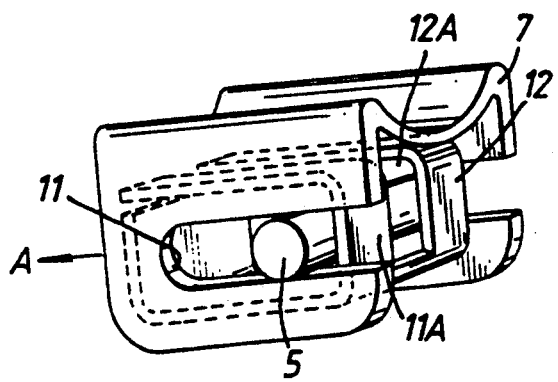
FIG. 4 is a perspective view of the adjustment mechanism of an adjustable reach steering column incorporating the present invention.
Figure 5:
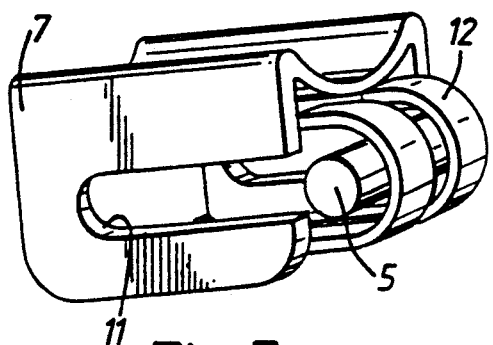
FIG. 5 is a perspective view similar to FIG. 4 showing the adjustment mechanism as energy is being absorbed during an impact.
Figure 6:
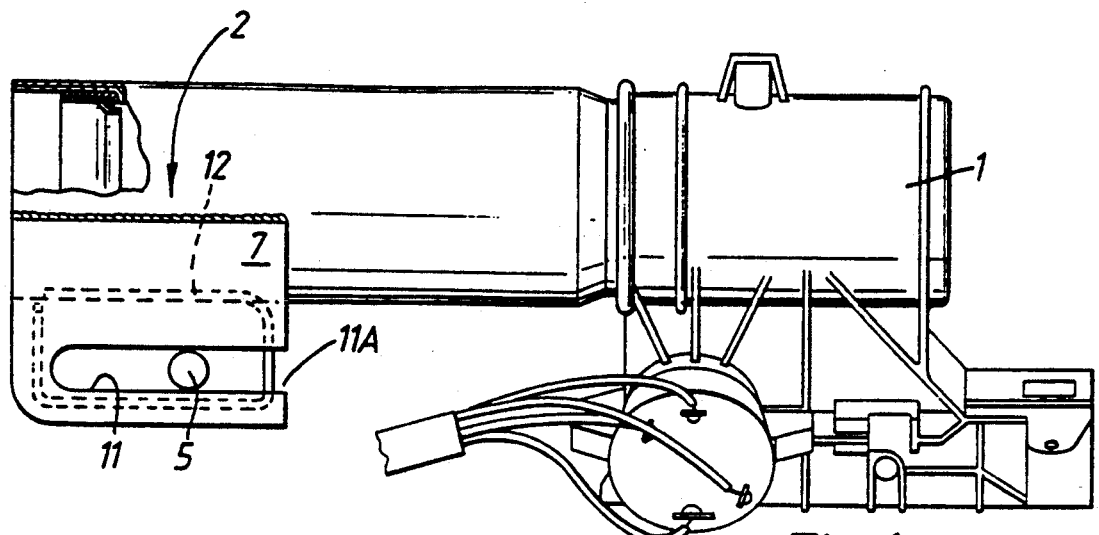
FIG. 6 is a general assembly side view of an upper portion of the steering column.

The third member as defined hereinabove is provided by a modified support member which is illustrated in FIGS. 4, 5 and 6 by a bent-over supporting strap 12 which has a slot 12A extending in from one end of it. In FIGS. 4 and 5, the tube 1 and brackets 2 have been omitted for clarity. The bottom portion of the strap 12 is welded or attached to the sides of the saddle bracket 7. The side portion of strap 12 adjacent the open end 11A of slot 11 and the top portion of strap 12 preferably are not welded or attached to the saddle bracket 7. Preferably slot 12A is open ended as shown in FIG. 4.

In the present case, there is no need to provide a convoluted steering column tube which is thus replaced by a straight tube.

It will be seen that the supporting strap 12, which is stiff but ductile, is effectively wrapped over itself such that it runs underneath and over the bolt 5. FIG. 4 shows the bolt near the open end of the slot 11 and just contacting the strap 12.

Upon vehicle crash and/or driver impact on the steering wheel which will cause the steering column 1 to collapse, the bolt 5 will move in a direction out of the slot 11 and it runs into the wrapped-over portion of the strap 12 as it leaves the slot 11 and the force exerted on the bolt 5 during such crash and/or impact then causes the support strap 12 to unwrap as shown in FIG. 5, thereby absorbing energy transmitted through the steering column.

The actual design of the device can be tuned to the desired requirements since vehicles tend to require their own individual column crash load curves. Modifications can therefore be made to the thickness of, for example, the strap 12 and the materials incorporated in the device. Another feature which can affect the basic load curve is the addition of the slot 12A and the length of that slot 12A can be used to affect the shape of the load curve. The side and upper portions of strap 12 may be tack welded to the sides of the saddle bracket 7 to further affect the shape of the load curve.

Figure 8:
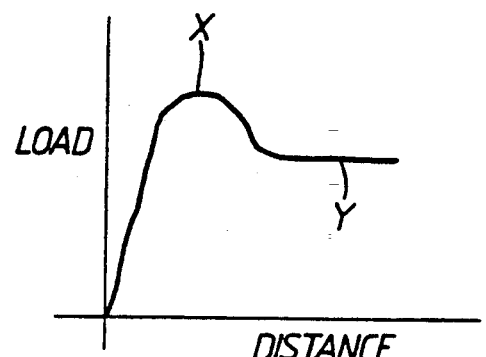
FIG. 8 is a graph of load against distance of the device to absorb energy transmitted through a steering column, where the strap-like member is provided with a slot along part of its length.

FIG. 8 gives a simple example of load against distance with point X showing a condition where the bolt is being applied against the strap 12 where there is no slot 12A, while the level Y shows the bolt 5 being applied against the strap 12 where the slot 12A is located. Distance is the distance travelled by bolt 5 relative to the mounting bracket 2 during an impact. Load is the force transmitted from the bolt 5 to the strap 12.

It will be appreciated that the present device is capable of being incorporated in a collapsible steering column that is rake and/or reach adjustable but can equally well be incorporated in tilting steering columns.

Figure 7:
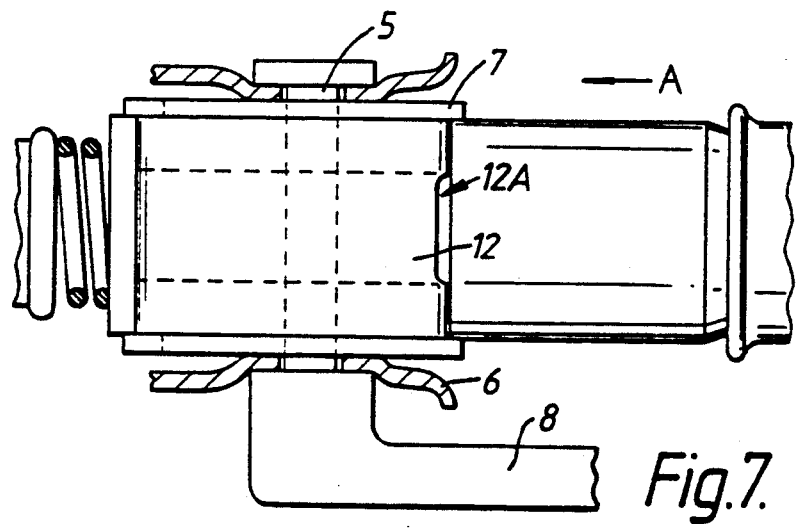
FIG. 7 is a plan view of the adjustment mechanism shown in FIG. 4.

Again, arrow A in FIG. 7 shows the impact direction.

It will be further appreciated that the second member can be in forms other than the bolt 5 shown, and the third member can be any suitable profile to match.

By moving the supporting strap 12 relatively to the saddle bracket 7, it will be appreciated that the achievable length of steering column adjustment can be regulated, while the length of the steering column collapse can be controlled by the length and shape of the third member (strap 12).

The device can be situated and will function whether it is underneath or on top of the steering column outer tube 1.

Furthermore, the device allows the use of a much more rigid upper tube, thereby increasing the natural frequency of the steering column.

Having described the invention, what is claimed is:

1. A mechanism for absorbing energy transmitted through a vehicle steering column in an impact situation, the mechanism comprising:
   a steering column support member;
   a slot located in the steering column support member;
   a bolt arrangement coupling the steering column support member with a mounting bracket while allowing the steering column to extend, the bolt arrangement being located in the slot to allow the bolt arrangement to be adjusted thereby; and
   energy absorption means for absorbing energy transmitted to the bolt arrangement from the steering column upon impact, the energy absorption means comprising a strap-like member which is wrapped around the bolt arrangement, the portion of the strap-like member which is wrapped around the bolt arrangement being plastically deformed in an impact situation, thereby absorbing energy.

2. The mechanism according to claim 1 wherein the slot in the steering column support member is open ended, thereby permitting the bolt arrangement to move out of the slot in an impact situation.

3. The mechanism according to claim 1 wherein the strap-like member has a bottom portion, a side portion and a top portion, the bottom portion being attached to the steering column support member, the top portion having an open-ended slot therein.

4. A device to absorb energy transmitted through a vehicle steering column in an impact situation, the device comprising:
   a reach adjustment mechanism including a first slotted member for connection to the steering column for reach adjustment thereof;
   a second member extending through the slot of the first member, the second member being utilized to clamp the reach adjustment mechanism; and
   a means for restricting relative movement between the first and second members in an impact situation, thereby absorbing energy transmitted through the steering column, the means for restricting relative movement being integral with the first member and limiting steering column reach adjustment;
   the slot in the first member being open ended, thereby permitting the second member to move out of the slot in an impact situation.

5. The device according to claim 4 wherein the second member is a bolt.

6. The device according to claim 4 wherein the means for restricting movement is a strap-like member which is wrapped over the second member.

7. The device according to claim 6 wherein a portion of the strap-like member contains a slot.

8. The device according to claim 7 wherein the strap-like member slot is open ended.

9. A mechanism for absorbing energy transmitted through a vehicle steering column in an impact situation, the mechanism comprising:
   a steering column support member;

a slot located in the steering column support member;

a bolt arrangement coupling the steering column support member with a mounting bracket while allowing the steering column to extend, the bolt arrangement being located in the slot to allow the bolt arrangement to be adjusted thereby, the slot in the steering column support member being open ended, thereby permitting the bolt arrangement to move out of the slot in an impact situation; and energy absorption means for absorbing energy transmitted to the bolt arrangement from the steering column upon impact, the energy absorption means comprising a strap-like member which is wrapped around the bolt arrangement and is plastically deformed in an impact situation, thereby absorbing energy, the strap-like member having a bottom portion, a side portion and a top portion, the bottom portion being attached to the steering column support member the top portion having an open-ended slot therein.

* * * * *